United States Patent
Park et al.

(10) Patent No.: US 7,450,553 B2
(45) Date of Patent: Nov. 11, 2008

(54) SYSTEM AND METHOD FOR SELECTING BEACON TRANSMISSION STARTING POINT IN COMMUNICATION SYSTEM

(75) Inventors: Jong-hun Park, Suwon-si (KR); Yong Liu, New York, NY (US); Myung-jong Lee, New York, NY (US); Xu-hui Hu, New York, NY (US)

(73) Assignees: Samsung Electronics Co., Ltd., Suwon-si (KR); City University of New York, New York, NY (US)

( * ) Notice: Subject to any disclaimer, the term of this patent is extended or adjusted under 35 U.S.C. 154(b) by 750 days.

(21) Appl. No.: 10/898,234

(22) Filed: Jul. 26, 2004

(65) Prior Publication Data
US 2005/0047428 A1    Mar. 3, 2005

Related U.S. Application Data

(60) Provisional application No. 60/499,369, filed on Sep. 3, 2003.

(30) Foreign Application Priority Data
Mar. 24, 2004    (KR)    ............ 10-2004-0020032

(51) Int. Cl.
*H04Q 7/24*    (2006.01)
*H04J 3/00*    (2006.01)

(52) U.S. Cl. ............................ 370/338; 370/345
(58) Field of Classification Search ................ 370/345, 370/349, 445, 458, 450, 338
See application file for complete search history.

(56) References Cited

U.S. PATENT DOCUMENTS

| | | | | |
|---|---|---|---|---|
| 4,773,065 A | * | 9/1988 | Kobayashi et al. | 370/362 |
| RE37,571 E | * | 3/2002 | Funke et al. | 455/403 |
| 6,467,003 B1 | * | 10/2002 | Doerenberg et al. | 710/117 |
| 2006/0050730 A1 | * | 3/2006 | Shvodian | 370/458 |

FOREIGN PATENT DOCUMENTS

| | | |
|---|---|---|
| JP | 2001-189951 A | 7/2001 |
| JP | 2003-229869 A | 8/2003 |
| JP | 2004-225839 A | 8/2004 |
| JP | 2005-506172 A | 3/2005 |
| WO | 02/094433 A1 | 11/2002 |

* cited by examiner

*Primary Examiner*—Kwang B. Yao
*Assistant Examiner*—Tung Q Tran
(74) *Attorney, Agent, or Firm*—Sughrue Mion, PLLC

(57) ABSTRACT

A system and method for selecting a starting point to transmit a beacon (BTSP) from a coordinator and a first node in a communication system. The communication system includes the coordinator, a first node group with at least one node having the first node which receives the beacon from the coordinator, and a second node group with at least one node having a second node which receives the beacon from the first node. The coordinator determines a beacon window size for the beacon transmission, selects the BTSP within the beacon window size, and transmits at the BTSP, the beacon containing information on the beacon window size and the BTSP. The first node selects its BTSP within the beacon window size so as not to overlap with the BTSP of the received beacon.

17 Claims, 5 Drawing Sheets

▨ : BEACON TRANSMISSION PERIOD

☐ : DATA TRANSMISSION PERIOD

☐ : INACTIVE PERIOD

SYSTEM AND METHOD FOR SELECTING BEACON TRANSMISSION STARTING POINT IN COMMUNICATION SYSTEM

CROSS-REFERENCE TO RELATED APPLICATIONS

This application claims the benefit of U.S. Provisional Application No. 60/499,369 filed on Sep. 3, 2003 in the United States Patent and Trademark Office, and Korean Patent Application No. 2004-20032 filed on Mar. 24, 2004 in the Korean Intellectual Property Office, the disclosures of which are incorporated herein by reference in their entirety.

BACKGROUND OF THE INVENTION

1. Field of the Invention

The present invention generally relates to a wireless personal area network, and more particularly, to a system and a method for selecting a beacon transmission starting point used by nodes forming a wireless personal area network (WPAN).

2. Description of the Related Art

A wireless personal area network (WPAN) wirelessly interconnects devices, such as computers and peripherals, mobile phones, and home appliances, in a short range of 10 m, supporting communications among the devices, and thus providing various services. The WPAN has been developed to implement networks among the devices with the development of personal mobile digital devices such as laptop computers and personal digital assistants (PDAs). The WPAN has distinctive features, including short range, compactness, low-power, and less interference.

FIG. 1 illustrates a WPAN having a plurality of clusters. A cluster consists of one coordinator and a plurality of nodes. The coordinator manages the nodes in the cluster. The coordinator generates and transmits a beacon to the nodes of the cluster. The nodes of the cluster receive the beacon from the coordinator and acquire a required information from information contained in the received beacon. Some nodes of the cluster of FIG. 1 can transmit the beacon.

FIG. 2 illustrates a beacon transmitted between a coordinator and a plurality of nodes of a cluster, which is described in detail below.

The cluster tree of FIG. 2 consists of one coordinator and the plurality of the nodes. The nodes are classified into nodes capable of transmitting the beacon and nodes incapable of transmitting the beacon. The first and second nodes can transmit the beacon. The third through sixth nodes may or may not transmit the beacon. It is assumed for the sake of clarity that the third to sixth nodes do not transmit the beacon. Frames used by the coordinator and the nodes are also illustrated in FIG. 2. The frame is divided into a beacon transmission period, a data transmission period, and an inactive period. The coordinator and the first and second nodes transmit the beacon in the beacon transmission period, and transmit data in the data transmission period. The coordinator and the first and second nodes do not perform any operation in the inactive period, reducing power consumption.

The first and second nodes receive the beacon from the coordinator; The first node broadcasts the beacon to the third and fourth nodes, and the second node broadcasts the beacon to the fifth and sixth nodes. In general, the nodes randomly select their beacon transmission periods (beacon transmission starting point), as shown in FIG. 2. However, this random selection of the beacon transmission period causes some problems.

Still referring to FIG. 2, the first node receives the beacon from the coordinator in the data transmission period. Accordingly, the first node cannot transmit and receive data to and from the third and fourth nodes during this time. The second node has to receive the beacon from the coordinator even in the inactive period where the second node does not perform unnecessary operations to save power. Albeit not illustrated in FIG. 2, the beacon transmission period of the node and that of the coordinator may overlap since the coordinator and the node randomly select their beacon transmission period.

FIG. 3 illustrates a new node 15 joining the cluster. The new node 15 needs to receive the beacon from the adjacent nodes to communicate with the existing nodes of the cluster. The new node 15 acquires required information using the received beacon.

The new node 15 can receive the beacons from the fourth, fifth, eighth, and ninth nodes. If the fourth and fifth nodes transmit the beacon in a same time slot, the new node 15 receives collided beacons. If the eighth and ninth nodes transmit the beacon in a same time slot, the new node 15 also receives collided beacons. As a result, the new node 15 cannot receive the beacon from any node. This problem may arise when positions of nodes are changed in the cluster.

SUMMARY OF THE INVENTION

To address the above problems of the conventional arrangement, an exemplary aspect of the present invention provides a system and a method for preventing collisions of beacons transmitted by nodes forming a cluster.

Another exemplary aspect of the present invention is to provide a system and a method for enhancing efficiency of data transmission by adjusting a beacon transmission starting point of each node.

Still another exemplary aspect of the present invention is to provide a system and a method enabling a new node joining a cluster to promptly receive an undamaged beacon.

In view of the above exemplary aspects and features of the present invention, there is provided an exemplary embodiment of a method for selecting a starting point to transmit a beacon from a coordinator and a first node in a communication system, comprising the coordinator, a first node group comprising at least one node having the first node which receives the beacon from the coordinator, and a second node group comprising at least one node having a second node which receives the beacon from the first node. The method comprises the coordinator selecting a beacon window size and a beacon transmission starting point (BTSP) within the beacon window size for the coordinator to transmit the beacon, the coordinator transmitting to the first node a beacon containing an information on the selected beacon window size and BTSP at the BTSP, and the first node selecting a BTSP within the beacon window size so as not to overlap with the BTSP contained in the beacon transmitted to the second node.

Consistent with another aspect of the present invention, there is provided another exemplary embodiment of a system for selecting a beacon transmission starting point (BTSP) in a communication system, comprising a coordinator, a first node group comprising at least one node having a first node which receives a beacon from the coordinator, and a second node group comprising at least one node having a second node which receives a beacon from the first node. The system includes the coordinator which selects a beacon window size to transmit the beacon and a BTSP within the beacon window size, and transmits at the BTSP, the beacon containing an information of the selected beacon window size and BTSP, and the first node selecting a BTSP within the beacon window size so as not to overlap with the BTSP in the received beacon.

BRIEF DESCRIPTION OF THE DRAWING FIGURES

These and/or other aspects and advantages of the invention will become apparent and more readily appreciated from the following description of exemplary embodiments, taken in conjunction with the accompanying drawings, in which.

DETAILED DESCRIPTION OF THE EMBODIMENTS

Figure 1:
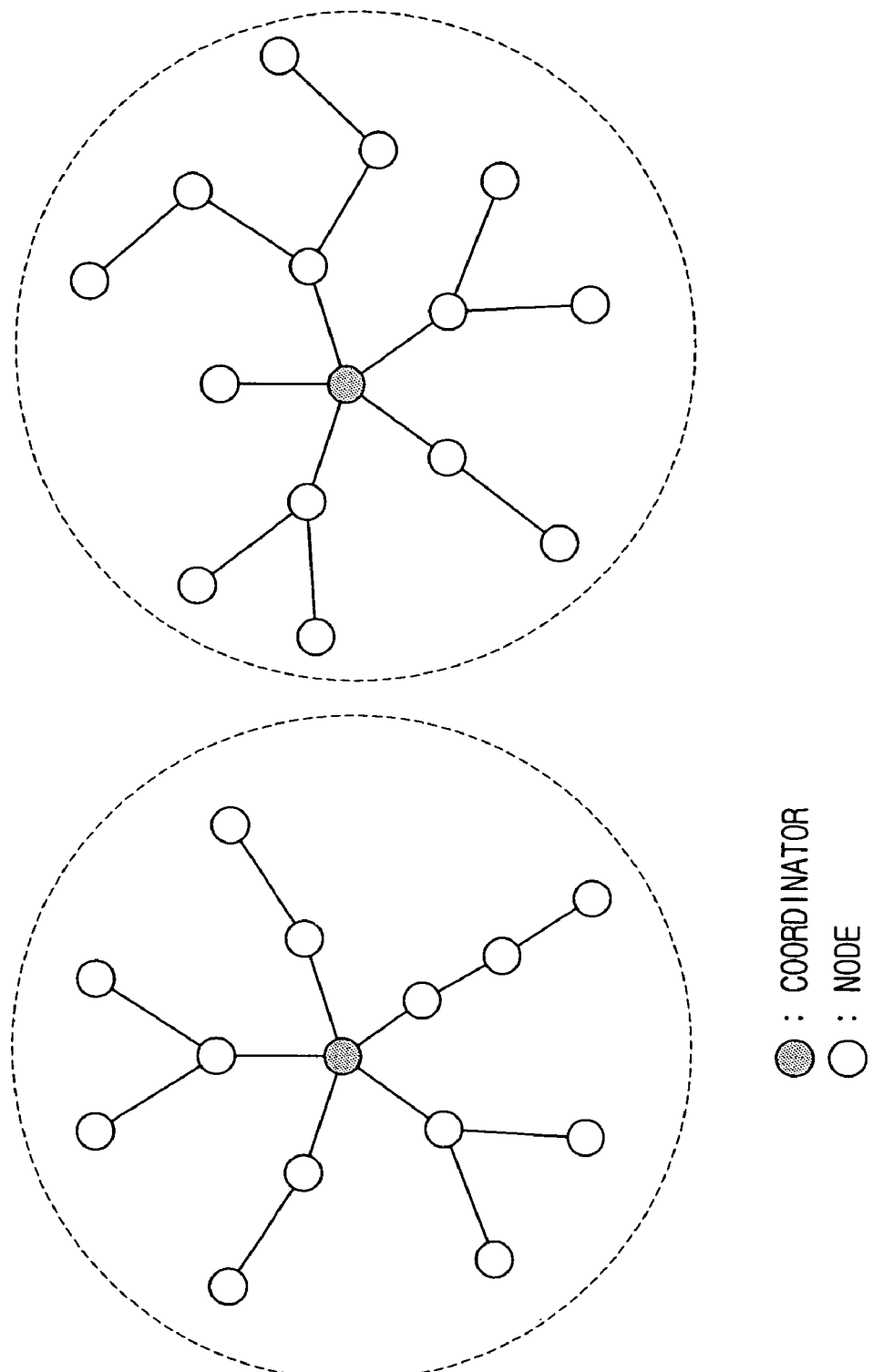
FIG. 1 illustrates a wireless personal area network having a plurality of clusters.
Figure 2:
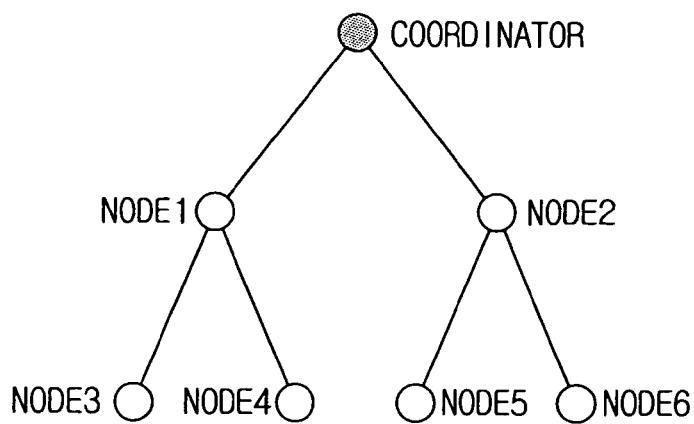
FIG. 2 illustrates beacon transmissions of a coordinator and a plurality of nodes forming a cluster.
Figure 2:
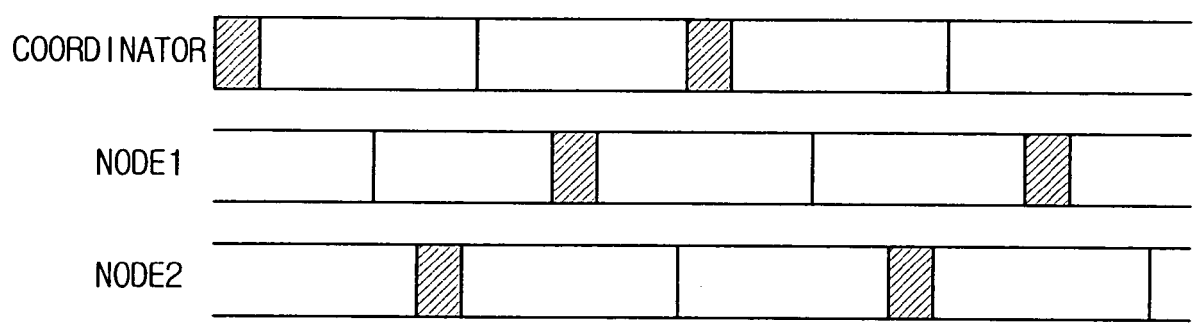

Reference will now be made in detail to embodiments of the present invention, examples of which are illustrated in the accompanying drawing figures, wherein like reference numerals refer to the like elements throughout. The embodiments are described below in order to explain various aspects of the present invention by referring to the drawing figures.

According to an embodiment of the present invention, a plurality of nodes schedule a beacon transmission starting point (BTSP) at three stages, which are described below in sequence.

Figure 3:
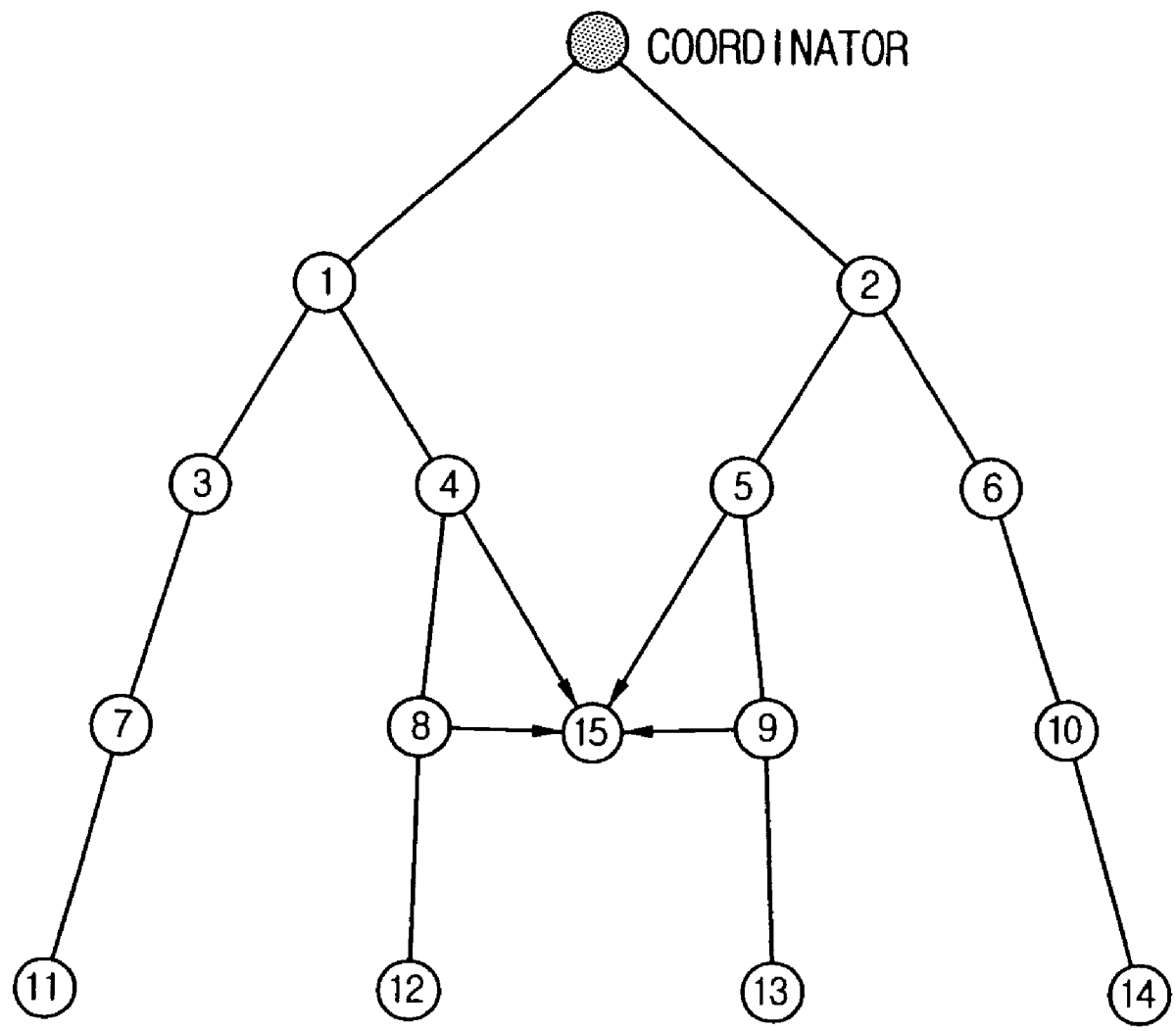
FIG. 3 illustrates problems occurring when a new node joins a cluster.

At a first stage, nodes of a cluster are interconnected with one another, and form a tree structure as shown in FIG. 3. The first stage may be performed using one of three options discussed below.

In a first option, a node of the cluster, which can transmit the beacon, is eligible to generate a token. Only one node of the cluster generates the token. When at least two nodes can transmit the beacon, a node to transmit the beacon is selected according to association between the two nodes. Hereinafter, the node to transmit the beacon is referred to as a coordinator. The coordinator randomly selects a BTSP. The coordinator broadcasts the token to the nodes of the cluster at the selected BTSP using a breadth first search (BFS) algorithm. The token contains information on a node to receive the token. Hence, the nodes know whether the token is sent to them using the information contained in the received token. If not, the received token is discarded.

If the node which received the token sent to it is eligible to transmit the beacon, the node randomly selects the BTSP and transmits the received token to the coordinator. If a token receiving node is not eligible to transmit the beacon, the node does not select the BTSP but transmits the token to the coordinator. Upon receiving the token, the coordinator updates information in the token, and broadcasts the token. The updated information of the token is related to a node to receive the token.

Accordingly, the coordinator transmits the token to and receives it from all nodes within one hop. The nodes which are within one hop from the coordinator and are eligible to transmit the beacon, can randomly select the BTSP.

Figure 4:
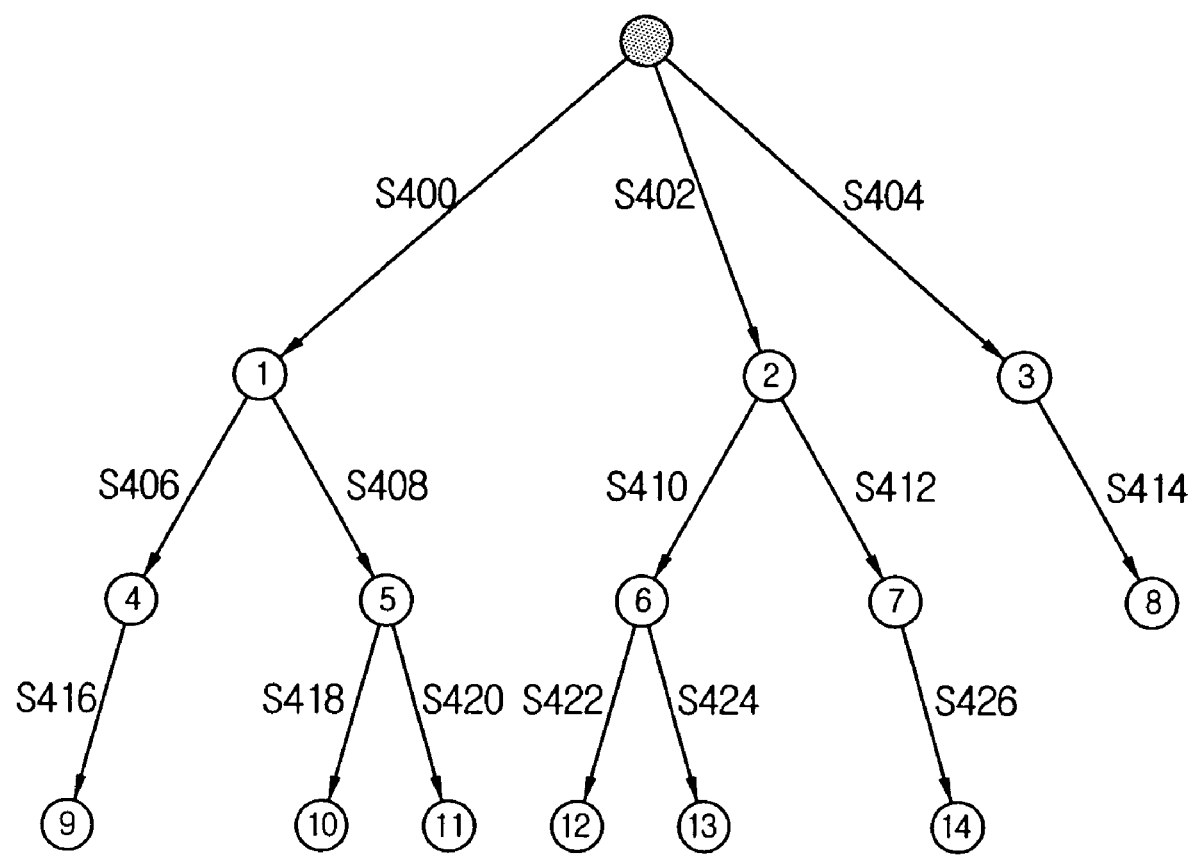
FIG. 4 illustrates exemplary operations for connecting nodes of a cluster in a tree structure according to an embodiment of the present invention.

The coordinator which transmitted to and received from the one-hop nodes, transmits the token to and receives it from nodes that are not within one hop, via the one-hop nodes. Referring to FIG. 4, the coordinator transmits the token to the first node. The first node broadcasts the received token to the fourth and fifth nodes within one hop. The node performs the same operations as the coordinator. The nodes of the cluster of FIG. 4 receive the token from the coordinator at steps S400 through S426.

In light of the foregoing, the nodes of the cluster can select the BTSP. However, this first option has a problem in that the BTSPs selected by the nodes of the cluster may overlap. A beacon transmission cycle (BTC) may be irregular since the BTSPs are selected randomly. For example, the coordinator may select a time slot 0 as the BTSP, and a one-hop node may select a time slot 8 as the BTSP. Then, the BTC of the coordinator becomes at least 9 times the time slot. The coordinator determines the BTC after the one-hop node selects the BTSP. That is, the BTC of the coordinator relies on the BTSPs of the one-hop nodes.

In a second option, the coordinator estimates a beacon window size using the number of one-hop nodes from the coordinator and the number of nodes connected to each one-hop node. Referring back to FIG. 4, the number of one-hop nodes from the coordinator is three. It is assumed that the coordinator knows the approximate number of nodes connectable to each one-hop node, and that the approximate number is five. Accordingly, the coordinator determines the beacon window size as being at least 15 times the time slot. The coordinator appends information of the beacon window size to the beacon and transmits the beacon.

Upon receiving the beacon, the nodes randomly select the BTSP within the beacon window size. More specifically, a child node selects the BTSP using the beacon window size contained in the beacon received from a parent node. The coordinator can more promptly determine the BTC as compared with the first option. However, the second option has a problem in that the BTSPs of the one-hop nodes from the coordinator may overlap and collide with one another.

In a third option, the coordinator estimates the beacon window size with a process similar to that of the second option. The coordinator selects the BTSP within the determined beacon window size. In general, the coordinator selects a smallest time slot of all available time slots as the BTSP. For example, the coordinator may select the time slot 0 as the BTSP. The coordinator appends information of the beacon window size and the selected BTSP to a payload of the beacon. The coordinator then broadcasts the beacon to neighboring nodes.

A beacon receiving node acquires information on the beacon window size and the BTSP selected by the coordinator, by using the information contained in the payload. The node selects the BTSP using the acquired information, which indicates available time slots for the BTSP. The BTSP may be selected in a random fashion from the available time slots. The node appends information on the beacon window size and the BTSPs of the coordinator and the node, to the payload. The node broadcasts the beacon to neighboring nodes in the selected time slot.

The information on the time slots configuring the beacon which is transmitted from the nodes of the cluster, includes information on the beacon window size, a time slot BTSP of its parent node, and its time slot BTSP. Accordingly, the nodes of the cluster select the BTSP within the beacon window size. The nodes out of one hop from the coordinator select as the BTSP, a smallest time slot of all available time slots.

A new node joining the cluster recognizes the information on the time slot of a neighbor node and that of a parent node of the neighbor node. Hence, the new node selects as the BTSP a smallest time slot of all available time slots, which does not overlap with the other time slots. If the new node of the cluster cannot receive any beacon from the neighbor nodes, the new node randomly selects one of the available time slots as the BTSP. Alternatively, the new node selects as the BTSP, a time slot before a last time slot of the available time slots within the beacon window size. Thus, the nodes of the cluster select the BTSP.

At a second stage following the first stage, the coordinator rearranges the BTSP of each node. The BTSP of each node is rearranged by a beacon scheduling token. The coordinator generates and transmits the beacon scheduling token using a depth first search (DFS) algorithm. Referring back to FIG. 4, the coordinator transmits the beacon scheduling token to the first node, and the first node transmits the beacon scheduling token to the fourth node. The fourth node transmits the beacon scheduling token to the ninth node. The ninth node transmits the beacon scheduling token to the fourth node, and the fourth node transmits the beacon scheduling token to the first node. The first node transmits the beacon scheduling token to the fifth node. All the nodes of the cluster receive the beacon scheduling token in the same manner. The node receiving the beacon scheduling token operates as below.

The node receiving the beacon scheduling token selects a smallest time slot of all available time slots, and notifies its children nodes and neighbor nodes of the selected time slot and a time slot of its parent node. Hence, time slots, except the notified time slots, are available to the children or neighbor nodes. A new node joining the cluster receives only one beacon in a time slot.

The BTSP is selected only at the second stage. That is, each node can select the BTSP by performing the second stage alone while the first stage is omitted. Meanwhile, the first stage ensures the efficient transmission of the beacon scheduling token.

At a third stage, the nodes of the cluster modify the BTSP at a certain time interval. The nodes transmit the beacon in a last time slot of the beacon window size according to a predetermined rule so as to prevent the overlapping of the time slots of the nodes. The predetermined rule is established in advance by the nodes which transmit the beacon in the last time slot. In general, a node transmits and receives data using a predetermined unique time information. Hence, the time information of the nodes may differ as time passes. While the nodes use different time slots from one another, the time slots may be transmitted at a same point in time due to differences of the time information. As a result, at least two beacons may be transmitted in the same time slot. For example, it is assumed that the fourth and fifth nodes transmit the beacon in the same time slot. If another node attempts to connect with the fourth node or fifth node, the node receives only the collided beacon. This beacon collision is addressed by transmitting the beacon in a last time slot at a certain time interval.

Figure 5:
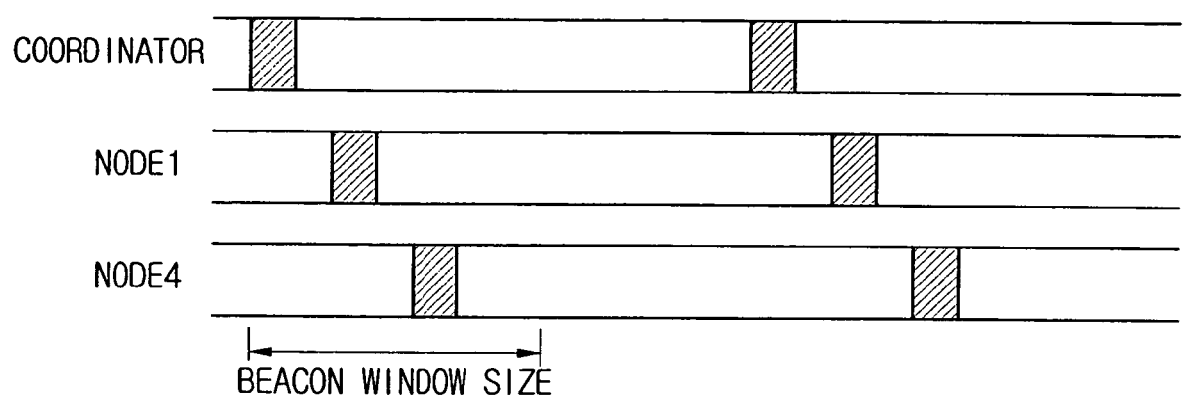
FIG. 5 illustrates exemplary beacon transmission starting points selected by nodes according to an embodiment of the present invention.

FIG. 5 illustrates an exemplary BTSP of each node according to an embodiment of the present invention. By way of example, three nodes are illustrated in FIG. 5. Each node selects the BTSP within the beacon window size, and transmits the beacon in the selected time slot, which does not overlap with the other time slots.

As explained in the foregoing, each node selects the BTSP within the beacon window size, thus enhancing data transmission efficiency. Each node transmits the beacon in a time slot which does not overlap with other time slots, by detecting the BTSPs of its parent node and neighbor nodes.

While exemplary embodiments of the present invention have been described, additional variations and modifications of the embodiments may be made without departing from the spirit and scope of embodiments of the present invention as defined in the following claims.

What is claimed is:

1. A method for selecting a starting point to transmit a beacon from a coordinator and a first node in a communication system comprising the coordinator, a first node group comprising at least one node having the first node which receives the beacon from the coordinator, and a second node group comprising at least one node having a second node which receives the beacon from the first node, the method comprising:

the coordinator selecting a beacon window size and an initial beacon transmission starting point (BTSP) within the beacon window size to transmit the beacon;

the coordinator transmitting to the first node, a beacon containing information on the selected beacon window size and the initial BTSP, at the initial BTSP; and the first node selecting a first BTSP within the beacon window size so as not to overlap with the initial BTSP contained in the received beacon, wherein the first node transmits to the second node group and neighbor nodes of the first node group, a beacon containing information on the selected beacon window size, and the initial and first BTSPs, and wherein the second node selects a second BTSP within the beacon window size so as not to overlap with the initial and first BTSPs.

2. The method of claim 1, wherein the nodes of the communication system sequentially select respective BTSPs using a depth first search (DFS) algorithm.

3. The method of claim 2, wherein the neighbor nodes of the first node group select a second BTSP within the beacon window size so as not to overlap with the initial and first BTSPs.

4. The method of claim 1, wherein the beacon window size is determined using a number of the nodes in the first node group.

5. The method of claim 4, wherein the nodes in the first and second node groups sequentially select BTSPs from time slots configuring the beacon window size.

6. The method of claim 5, wherein the nodes in the first and second node groups do not select a last time slot of the beacon window size as their respective BTSPs.

7. The method of claim 6, wherein the nodes in the first and second node groups transmit the beacon using the last time slot at a time interval.

8. A system for selecting a beacon transmission starting point (BTSP) in a communication system comprising a coordinator, a first node group comprising at least one node having a first node which receives a beacon from the coordinator, and a second node group comprising at least one node having a second node which receives a beacon from the first node, the system comprising:

the coordinator selecting a beacon window size to transmit the beacon and an initial beacon starting point (BTSP) within the beacon window size, and transmitting at the initial BTSP, the beacon containing information of the selected beacon window size and the initial BTSP; and the first node selecting a first BTSP within the beacon window size so as not to overlap with the initial BTSP in the received beacons wherein the first node transmits to the second node group and neighbor nodes of the first node group, a beacon containing information on the selected beacon window size, and the initial and first BTSPs, and wherein the second node selects a second BTSP within the beacon window size so as not to overlap with the initial and first BTSPs.

9. The system of claim 8, wherein the nodes of the first and second node groups sequentially select respective BTSPs using a depth first search (DFS) algorithm.

10. The system of claim 9, wherein the neighbor nodes of the first node group select a second BTSP within the beacon window size so as not to overlap with the initial and first BTSPs.

11. The system of claim 8, wherein the coordinator determines the beacon window size using a number of the nodes in the first node group.

12. The system of claim 11, wherein the nodes in the first and second node groups sequentially select BTSPs from time slots configuring the beacon window size.

13. The system of claim 12, wherein the nodes in the first and second node groups do not select a last time slot of the beacon window size as their respective BTSPs.

14. The system of claim 13, wherein the nodes in the first and second node groups transmit the beacon using the last time slot at a time interval.

15. A method of selecting a starting point to transmit a beacon in a communication system, comprising:

selecting a beacon window size;

selecting a beacon transmission starting point, wherein said selected beacon transmission starting point is within said selected beacon window size;

transmitting said beacon from a coordinator to a first node at said beacon transmission starting point, said beacon comprising said selected beacon window size and said selected beacon transmission starting point;

selecting another beacon transmission starting point, wherein said selected another beacon transmission starting point is within said beacon window size and does not overlap with said beacon transmission starting point in said transmitted beacon, wherein the first node transmits to a second node group and neighbor nodes of a first node group to which the first node belongs, a beacon containing information on the selected beacon window size, and the initial and first BTSPs, and wherein a second node of the second node group selects a second BTSP within the beacon window size so as not to overlap with the initial and first BTSPs.

16. The method of claim 15, wherein said selecting a beacon window size and said selecting a beacon transmission starting point are performed in said coordinator, and said selecting another beacon transmission starting point is performed in said first node.

17. A system for selecting a beacon transmission starting point in a communication system, comprising:

a coordinator;

a first node group comprising at least one node having a first node which receives a beacon from said coordinator; and a second node group further comprising at least one node having a second node which receives a beacon from said first node;

wherein said coordinator selects a beacon window size and a beacon transmission starting point within said selected beacon window size, to transmit said beacon at said selected beacon transmission starting point, said beacon comprising said selected beacon window size and said beacon transmission starting point, and said first node selecting another beacon transmission starting point within said selected beacon window size so as not to overlap with said beacon transmission stating point in said transmitted beacon;

wherein the first node transmits to the second node group and neighbor nodes of the first node group, a beacon containing information on the selected beacon window size, and the initial and first BTSPs, and wherein the second node selects a second BTSP within the beacon window size so as not to overlap with the initial and first BTSPs.

* * * * *